US009167238B2

(12) United States Patent
Seo et al.

(10) Patent No.: US 9,167,238 B2
(45) Date of Patent: Oct. 20, 2015

(54) 3D DISPLAY APPARATUS FOR USE IN SYNCHRONIZATION WITH 3D GLASSES AND 3D DISPLAY METHOD THEREOF

(75) Inventors: Je-hwan Seo, Daegu (KR); Yong-jin Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 767 days.

(21) Appl. No.: 13/442,992

(22) Filed: Apr. 10, 2012

(65) Prior Publication Data

US 2013/0002836 A1    Jan. 3, 2013

(30) Foreign Application Priority Data

Jun. 29, 2011    (KR) .................. 10-2011-0063980

(51) Int. Cl.
*H04N 13/00* (2006.01)
*H04N 13/04* (2006.01)

(52) U.S. Cl.
CPC ....... *H04N 13/0438* (2013.01); *H04N 13/0497* (2013.01)

(58) Field of Classification Search
CPC .......... H04N 13/0438; H04N 13/0051; H04N 13/0497
USPC ............................................. 348/56, E13.059
See application file for complete search history.

(56) References Cited

U.S. PATENT DOCUMENTS

| | | | | |
|---|---|---|---|---|
| 4,672,434 A | * | 6/1987 | Suzuki et al. | 348/56 |
| 5,684,529 A | * | 11/1997 | Yoshimi et al. | 348/43 |
| 5,726,703 A | * | 3/1998 | Izawa et al. | 348/46 |
| 6,316,974 B1 | * | 11/2001 | Taraci et al. | 327/147 |
| 8,258,831 B1 | * | 9/2012 | Banai et al. | 327/155 |
| 2005/0012524 A1 | * | 1/2005 | Green et al. | 327/3 |
| 2010/0295929 A1 | * | 11/2010 | Yoshifuji et al. | 348/53 |
| 2011/0285833 A1 | * | 11/2011 | Tsurumoto et al. | 348/56 |
| 2011/0292187 A1 | * | 12/2011 | Chen et al. | 348/51 |
| 2012/0176485 A1 | * | 7/2012 | Miyauchi et al. | 348/56 |
| 2012/0314041 A1 | * | 12/2012 | Hachiya | 348/56 |
| 2013/0038706 A1 | * | 2/2013 | Nagara | 348/56 |

FOREIGN PATENT DOCUMENTS

JP          08-317426     * 11/1996
WO    WO 2011/052125 A1 *  5/2011

* cited by examiner

*Primary Examiner* — David Harvey
(74) *Attorney, Agent, or Firm* — Sughrue Mion, PLLC

(57) ABSTRACT

A 3-dimensional (3D) display apparatus and a 3D display method thereof are provided. The 3D display apparatus includes: a display unit which outputs a plurality of image frames; a synchronization signal processor which generates a synchronization signal corresponding to the image frames; a controller which acquires period information of first and second sequences of the synchronization signal and determines whether the synchronization signal has been stabilized, according to change information of the period information; and a communicator which determines time information of the stabilized synchronization signal according to the determination result and transmits shutter control data, which is generated based on the time information, to 3D glasses.

29 Claims, 5 Drawing Sheets

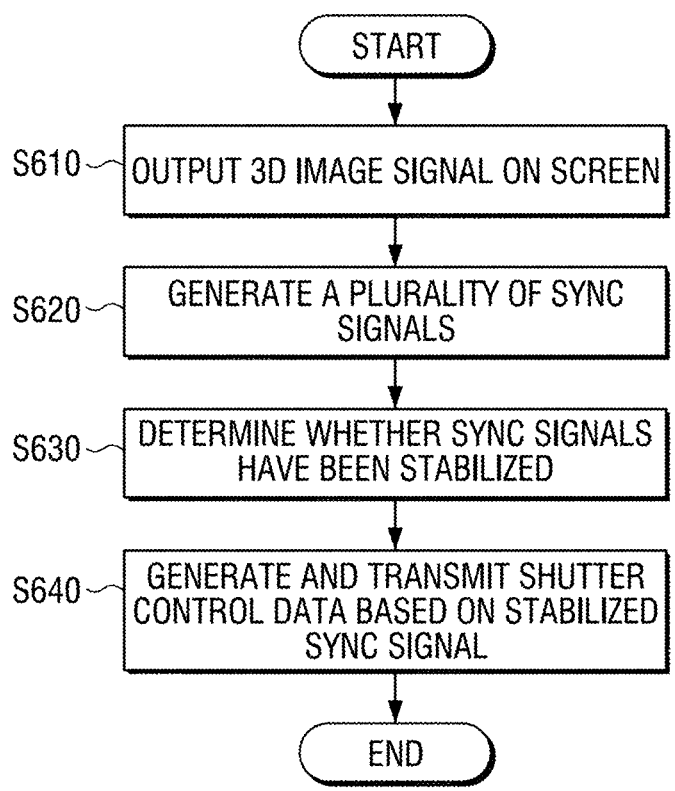

3D DISPLAY APPARATUS FOR USE IN SYNCHRONIZATION WITH 3D GLASSES AND 3D DISPLAY METHOD THEREOF

CROSS-REFERENCE TO RELATED APPLICATION

This application claims priority from Korean Patent Application No. 10-2011-0063980, filed on Jun. 29, 2011, in the Korean Intellectual Property Office, the disclosure of which is incorporated herein by reference in its entirety.

BACKGROUND

1. Field

Apparatuses consistent with exemplary embodiments relate to a 3-dimensional (3D) display apparatus and a 3D display method thereof, and more particularly, to a 3D display apparatus which displays a 3D image and a 3D display method thereof.

2. Description of the Related Art

Efforts to develop a 3-dimensional (3D) display apparatus have accelerated for a further realistic watching. Therefore, a 3D image signal, which is mainly watched in a theater, may be watched in a household by using a general display apparatus such as a television (TV).

A 3D display apparatus is classified into a glasses type and a non-glasses type according to whether glasses are to be worn by a user or viewer. The non-glasses type corresponds to a method of converting an image signal into a multifocal image and outputting the multifocal image so that a user feels a 3D effect without glasses.

The glasses type corresponds to a method by which if a display apparatus alternately outputs a left eye image and a right eye image, a user recognizes the left eye image with the left eye and the right eye image with the right eye and thus feels a 3D effect due to a displacement between the left and right eye images.

The method that corresponds to the glasses type of apparatus may be classified into a shutter glasses method and a polarized method.

The shutter glasses method refers to a method by which shutters of glasses are switched so that a left eye glass is turned on when a left eye image is output and a right eye glass is turned on when a right eye image is output. The polarized method refers to a method by which a polarized direction of light outputted from a display apparatus alternately shifts at 0° and 90° for a user who wears glasses having different polarized directions.

The shutter glasses method adopts glasses which are more expensive than the polarized method but is mainly adopted for use in conjunction with a household TV.

In the shutter glasses method, an infrared (IR) method is used to provide an image of a 3D display apparatus and transmit a synchronization signal which is to synchronize on-off operations of left and right eye glasses of 3D glasses.

Therefore, noise is inserted into a synchronization signal through three wavelengths of a signal transmitted by a fluorescent lamp or by another home appliance which transmits an IR signal, such as a remote controller, and thus shutter glasses frequently malfunction due to the inserted noise.

Also, if a wrong timing value is read or a 3D synchronization jitter occurs due to noise occurring due to a channel change or an input source change of a 3D display apparatus when generating a synchronization signal, the shutter glasses method does not include a method of correcting the wrong timing value or the 3D synchronization jitter.

Accordingly, a method of effectively filtering a 3D synchronization jitter occurring in a synchronization signal generated by a 3D display apparatus to drive 3D glasses according to a stabilized synchronization signal is required.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a 3-dimensional (3D) display apparatus which filters a 3D synchronization jitter to drive 3D glasses according to a stabilized synchronization signal, and a display method thereof.

According to an aspect of an exemplary embodiment, there is provided a 3D display apparatus. The 3D display apparatus may include: a display unit which outputs a plurality of image frames; a synchronization signal processor which generates a synchronization signal corresponding to the image frames; a controller which acquires period information of first and second sequences of the synchronization signal and determines whether the synchronization signal has been stabilized, according to change information of the period information; and a communicator which determines time information of the stabilized synchronization signal according to the determination result and transmits shutter control data, which is generated based on the time information, to 3D glasses.

The period information may be determined by the preset number of synchronization signals.

The second sequence may be a sequence of the synchronization signal immediately after the first sequence.

The change information may be determined by a difference between the period information of the first sequence and the period information of the second sequence.

Whether the synchronization signal has been stabilized may be determined according to whether the change information is less than preset time information.

If a channel change or an input source change occurs, the controller may determine whether the synchronization signal has been stabilized.

The communicator may be a radio frequency (RF) communication module.

The time information may be the period information of the second sequence.

The second sequence may be a last one of at least four or more synchronization signal sequences which are received by the controller.

If the change information is more than the preset time information, the controller may acquire period information of a third sequence after the second sequence and update the change information to determine whether the synchronization signal has been stabilized.

The shutter control data may be data which is related to turning on or off of shutters of the 3D glasses.

According to an aspect of another exemplary embodiment, there is provided a 3D display apparatus. The 3D display apparatus may include: a display unit which outputs a 3D image signal including a plurality of image frames; a synchronization signal processor which generates a plurality of synchronization pulses at output times of the plurality of image frames; a controller which divides the plurality of synchronization pulses in preset numbers to group the plurality of synchronization pulses into a plurality of frame sections and determines whether a synchronization signal has been stabilized, according to a time difference between two of the plurality of frame sections; and a communicator which determines time information of the stabilized sync signal according to the determination result and transmits shutter control data, which is generated based on the time information, to 3D glasses.

The controller may calculate averages of time intervals of synchronization pulses of two consecutive frame sections based on a predetermined one of the plurality of frame sections, and may calculate a time difference between the calculated averages.

The controller may determine whether the synchronization signal has been stabilized, according to a time difference between a third frame section and a subsequent frame section of the plurality of frame sections.

If the calculation result is more than a preset threshold value, the controller may repeat the calculation with respect to the second frame section of the two consecutive frame sections and the subsequent frame section, and if the calculation result is less than the preset threshold value, the controller may determine that synchronization signals of the second frame section of the two consecutive frame sections and the subsequent frame section have been stabilized.

The controller may generate the shutter control data, which is related to turning on or off of shutters of the 3D glasses, based on the synchronization signals of the second frame section and the subsequent frame section, and may control the communicator to transmit the shutter control data to the 3D glasses.

If a channel change or an input source change occurs, the controller may determine whether the synchronization signal has been stabilized.

The communicator may be an RF communication module.

The controller may sequentially divide the plurality of synchronization pulses into groups of 16 to group the plurality of synchronization pulses into the plurality of frame sections, and may determine whether the synchronization signal has been stabilized according to whether the time difference is smaller than or equal to 4 µs.

According to an aspect of another exemplary embodiment, there is provided a 3D display method of a 3D display apparatus. The 3D display method may include: outputting a 3D image signal including a plurality of image frames on a screen; generating a plurality of synchronization pulses at output times of the plurality of image frames; dividing the plurality of synchronization pulses in preset numbers to group the plurality of synchronization pulses into a plurality of frame sections and determining whether a synchronization signal has been stabilized, according to a time difference between two of the plurality of frame sections; determining time information of the stabilized synchronization signal according to the determination result; and transmitting shutter control data, which is generated based on the time information, to 3D glasses.

The determination of whether the synchronization signal has been stabilized may include: calculating averages of time intervals of synchronization pulses of two consecutive frame sections based on a predetermined frame section of the plurality of frame sections, and calculating a time difference between the calculated averages.

Whether the synchronization signal has been stabilized may be determined according to a time difference between a third frame section and a subsequent frame section of the plurality of frame sections.

If the calculation result is more than a preset threshold value, the calculation may be repeated with respect to the second frame section of the two consecutive frame sections and a subsequent frame section, and if the calculation result is less than the preset threshold value, synchronization signals of the second frame section and the subsequent frame section may be determined to be stabilized.

The transmission of the shutter control data to the 3D glasses may include: generating the shutter control data, which is related to turning on or off of shutters of the 3D glasses, based on the synchronization signals of the second frame section and the subsequent frame section; and transmitting the shutter control data to the 3D glasses.

If a channel change or an input source change occurs, whether the synchronization signal has been stabilized may be determined.

The shutter control data may be transmitted to the 3D glasses by using an RF communication method.

The plurality of synchronization pulses may be sequentially divided into groups of 16 to be grouped into the plurality of frame sections, and whether the synchronization signal has been stabilized may be determined according to whether the time difference is smaller than or equal to 4 µs.

According to an aspect of another exemplary embodiment, there is provided a recording medium which stores a program for performing a filtering method of filtering a 3D synchronization jitter. The filtering method may include: sequentially dividing a plurality of synchronization pulses, which are generated at output times of first and second image frames of a 3D image signal, in preset numbers to group the plurality of synchronization pulses into a plurality of frame sections; and selecting a frame section for driving 3D glasses from the plurality of frame sections to filter the 3D synchronization jitter.

The filtering of the 3D synchronization jitter may include: sequentially dividing the plurality of synchronization pulses in the preset numbers to group the plurality of synchronization pulses into the plurality of frame sections; determining whether each of the plurality of synchronization pulses has been stabilized, according to a time difference between averages of synchronization pulses of two consecutive frame sections of the plurality of frame sections; determining time information of each stabilized synchronization signal according to the determination result; and transmitting shutter control data, which is generated based on the time information, to the 3D glasses, wherein the averages of the synchronization pulses of the two consecutive frame sections are calculated based on a predetermined frame section of the plurality of frame sections to calculate the time difference between the calculated averages. If the calculation result is more than a preset threshold value, the calculation is repeated with respect to the second frame section of the two consecutive frame sections and a subsequent frame section, and if the calculation result is less than the preset threshold value, synchronization pulses of the second frame section of the two consecutive frame sections are determined to be stabilized.

As described above, according to the exemplary embodiments, an operation of 3D glasses may be controlled according to a stabilized synchronization signal from which a 3D synchronization jitter has been filtered. Therefore, malfunctioning of the 3D glasses may be prevented.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by the following detailed description of exemplary embodiments, with reference to the accompanying drawings, in which:

FIG. 6 is a flowchart illustrating a 3D display method of filtering a synchronization signal according to an exemplary embodiment.

DETAILED DESCRIPTION OF THE EXEMPLARY EMBODIMENTS

Figure 1:
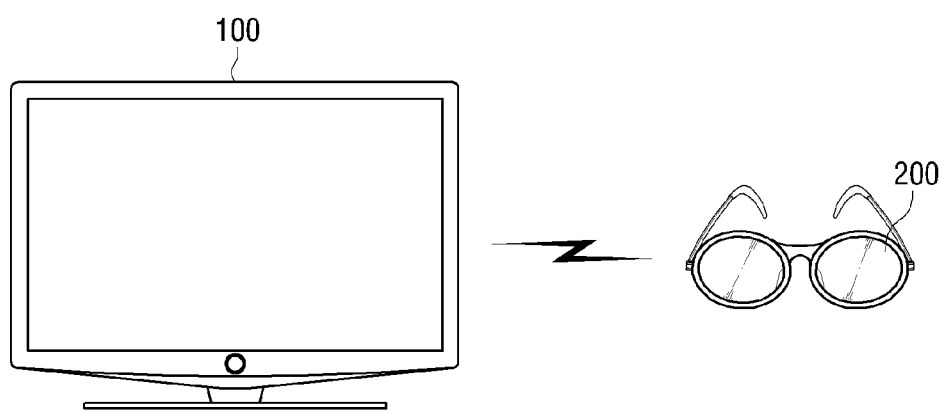
FIG. 1 is a view illustrating a 3-dimensional (3D) image providing system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail, because they would obscure the exemplary embodiments with unnecessary detail.

FIG. 1 is a view illustrating a 3-dimensional (3D) image providing system according to an exemplary embodiment. Referring to FIG. 1, the 3D image providing system includes a 3D display apparatus 100 which displays a 3D image on a screen and 3D glasses 200 which are used to watch the 3D image.

The 3D display apparatus 100 outputs a plurality of image frames according to a 3D image signal and generates a synchronization signal corresponding to the plurality of image frames. In other words, the 3D display apparatus 100 generates the synchronization signal which is to drive the 3D glasses 200 at output times of left and right eye image frames.

The 3D display apparatus 100 acquires period information of first and second sequences of the synchronization signal and determines whether the synchronization signal has been stabilized, according to changes in the period information. In particular, the first and second sequences refer to frame sections into which the synchronization signal is divided in preset numbers of synchronization pulses and grouped.

In more detail, the 3D display apparatus 100 divides a plurality of synchronization pulses in preset numbers to group the plurality of synchronization pulses into a plurality of frame sections and determines whether the synchronization signal has been stabilized, according to a time difference between two of the plurality of frame sections.

The 3D display apparatus 100 determines time information of the stabilized synchronization signal, generates shutter control data, which is to alternately open and close left and right eye glasses of the 3D glasses 200, based on the time information, and transmits the shutter control data to the 3D glasses 300 according to a radio frequency (RF) communication protocol.

Therefore, if the 3D display apparatus 100 turns on a 3D mode, the 3D display apparatus 100 may filter the synchronization signal, which has non-uniform time intervals due to a 3D synchronization jitter which occurs due to a channel change or an input source change in the 3D mode. Also, the 3D display apparatus 100 may control on/off operations of the 3D glasses 200 according to the stabilized synchronization signal to prevent the 3D glasses 200 from malfunctioning.

The 3D glasses 200 are realized as active type shutter glasses and receive a shutter control signal from the 3D display apparatus 100 to selectively open and close the left and right eye glasses of the 3D glasses 200.

According to various exemplary embodiments, the 3D display apparatus 100 may filter a 3D synchronization jitter to generate shutter control data, which is to control opening and closing of the left and right eye glasses of the 3D glasses 200 based on a stabilized synchronization signal. Therefore, the 3D display apparatus 100 may prevent flickers from occurring due to malfunctioning of the 3D glasses 200.

Also, since the 3D display apparatus 100 transmits the shutter control signal according to the RF communication protocol, the 3D display apparatus 100 may prevent the shutter glasses of the 3D glasses 200 from malfunctioning due to an insertion of noise into a synchronization signal through three wavelengths of a fluorescent lamp or other home appliances which transmit an RF signal, such as a remote controller.

The 3D image providing system according to the present exemplary embodiment may further include a camera (not shown), which is to generate the 3D image.

The camera is a type of photographing apparatus which generates a 3D image and generates a left eye image which is captured to be provided to a left eye of a user and a right eye image which is captured to be provided to a right eye of the user. The 3D image includes left and right eye images which are alternately provided to the left and right eyes of the user so as to generate a 3D effect due to a binocular disparity.

For this purpose, the camera includes a left eye camera which is to generate the left eye image and a right eye camera which is to generate the right eye image. Also, a distance between the left and right eye cameras is determined in consideration of a distance between both eyes of a human.

The camera transmits the captured left and right eye images to the 3D display apparatus 100. In particular, the left and right eye images are transmitted from the camera to the 3D display apparatus 100 in a format in which a frame includes only one of the left and right eye images or in a format in which a frame includes both the left and right eye images.

The camera may determine one of various 3D image formats, generate a 3D image according to the determined 3D image format, and transmit the 3D image to the 3D display apparatus 100.

Figure 2:
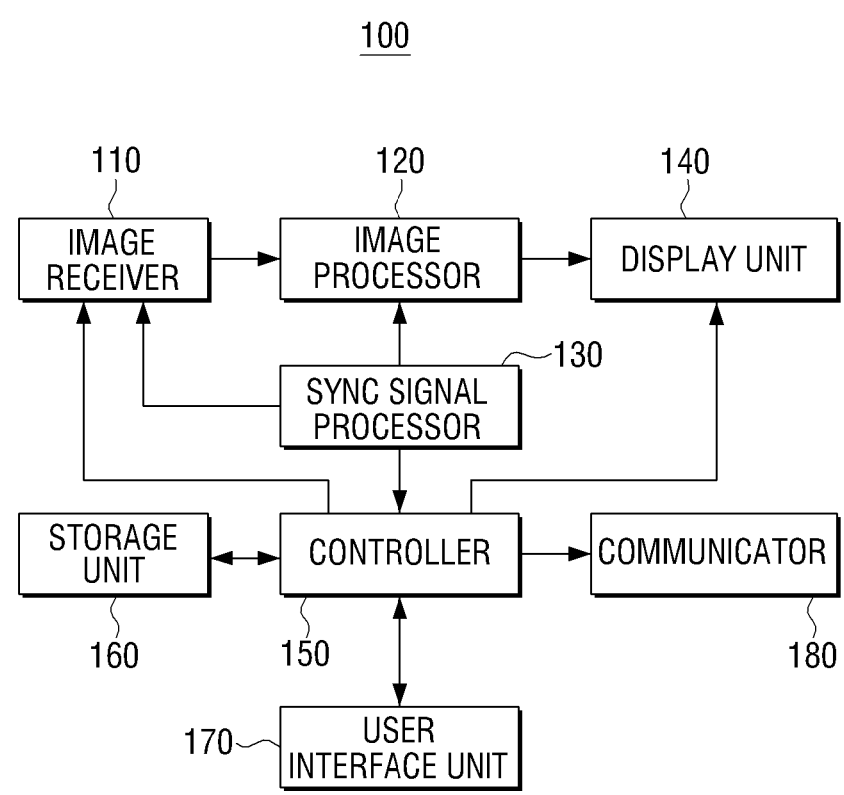
FIG. 2 is a block diagram illustrating a structure of a 3D display apparatus according to an exemplary embodiment.

FIG. 2 is a block diagram illustrating a structure of the 3D display apparatus 100, according to an exemplary embodiment. Referring to FIG. 2, the 3D display apparatus 100 includes an image receiver 110, an image processor 120, a synchronization signal processor 130, a display unit 140, a controller 150, a storage unit 160, a user interface unit 170, and a communicator 180.

The image receiver 110 receives a 2D or 3D image signal from a broadcasting station or a satellite by a wire or wireless communication channel and demodulates the 2D or 3D image signal. The image receiver 110 may also be connected to an external device, such as a camera or the like, to receive a 3D image. The external device may be connected to the 3D display apparatus 100 by a wireless communication channel or by a wire communication channel through an interface such as S-Video, a component, a composite, D-Sub, a digital visual interface (DVI), a high definition multimedia interface (HDMI), or the like.

The 3D image refers to an image which includes at least one frame, i.e., an image in which each of frames includes left and right eye images or each of frames includes a left eye image or a right eye image. In other words, the 3D image is an image which is generated according to one of various 3D image formats.

Therefore, the 3D image received through the image receiver 110 may be generated according to various formats. In particular, the 3D image may be generated according to a format complying with one of a top-bottom method, a side-by-side method, a horizontal interleave method, a vertical interleave method, a checker board method, and a sequential frame method.

The image receiver 110 transmits the received 2D or 3D image to the image processor 120.

The image processor 120 performs signal processing, such as video decoding, format analyzing, video scaling, etc., and an addition operation of a graphical user interface (GUI) with respect to the 2D or 3D image received through the image receiver 110.

In particular, the image processor 120 generates left and right eye images corresponding to a size (e.g., 1920*1080 resolution) of a screen by using a format of the 2D or 3D image received through the image receiver 110.

For example, if the format of the 3D image is a format complying with the top-bottom method, the side-by-side method, the horizontal interleave method, the vertical interleave method, the checker board method, or the sequential frame method, the image processor 120 extracts left and right eye images from each image frame and scales or interpolates the extracted left and right eye images to generate left and right eye images which are to be provided to a user.

If the format of the 3D image complies with a general frame sequence method, the image processor 220 prepares to extract a left or right eye image from each frame and then provides the extracted left or right eye image to the user.

Input information regarding on the format of the 3D image may be included or may not be included in the 3D image.

For example, if the input information regarding the format of the 3D image is included in the 3D image, the image processor 120 analyzes the 3D image to extract the information from the 3D image and processes the 3D image according to the extracted information. If the information regarding the format of the 3D image is not included in the 3D image, the image processor 120 processes the 3D image according to a format input from the user or a preset format.

The image processor 120 time-divides the processed left and right eye images and alternately transmits the time-divided left and right eye images to the display unit 130. In other words, the image processor 120 transmits the left and right eye images to the display unit 140 in sequential order, such as, for example, "left eye image L1→right eye image R1→left eye image L2→right eye image R2→ . . . ."

The synchronization signal processor 130 generates a synchronization signal corresponding to a plurality of image frames based on the 3D image. In more detail, the synchronization signal processor 130 may generate a plurality of synchronization pulses respectively corresponding to output times of a plurality of image frames, i.e., display timings of left and right eye images. The synchronization signal processor 130 transmits the generated synchronization signal to the controller 150.

The display unit 140 outputs the plurality of image frames. In more detail, the display unit 140 alternately outputs the left and right eye images, which are output from the image processor 120, and provides the left and right eye images to the user.

The controller 150 controls an overall operation of the 3D display apparatus 100 according to a user command received from the user interface unit 180 or a preset option.

In particular, the controller 150 controls the image receiver 110 and the image processor 120 to receive the 3D image, generate the synchronization signal corresponding to the left and right eye images based on the 3D image, divide the 3D image into left and right eye images, and scale or interpolate each of the left and right eye images to a size enough to be displayed on a screen.

The controller 150 determines whether the synchronization signal provided from the synchronization signal processor 130 has been stabilized. The controller 150 filters the synchronization signal having non-uniform time intervals according to whether the synchronization signal has been stabilized.

In general, in order to open and close left and/or right eye shutter glasses of 3D glasses at fixed times, a time interval between a synchronization signal corresponding to an output time of a left eye image frame and a synchronization signal corresponding to an output time of a right eye image frame should be fixed.

However, if a 3D synchronization jitter occurs when a 3D display apparatus turns on a 3D mode, and a channel or an input source is changed in the 3D mode, a time interval between synchronization signals becomes non-uniform.

Therefore, the left and/or right eye shutter glasses of the 3D glasses may not be opened and closed at fixed timings, and thus flickers may occur in the 3D glasses. As a result, a synchronization signal, which has non-uniform time intervals due to a 3D synchronization jitter, is to be filtered.

For this purpose, the controller 150 acquires period information of first and second sequences of the synchronization signal. In particular, the period information of the first and second sequences is determined by the preset number of synchronization pulses. In other words, sequences may respectively include the same number of synchronization pulses.

The controller 150 determines change information according to a difference between the period information of the first sequence and the period information of the second sequence, which is a sequence of the synchronization signal after the first sequence, and determines whether the determined change information is less than preset time information to determine whether the synchronization signal has been stabilized.

In more detail, if the change information between the first and second sequences is less than the preset time information, the controller 150 determines groupings of synchronization pulses, which are included in the second sequence and subsequent sequences, as stabilized synchronizaton signals. If the change information between the first and second sequences is more than the preset time information, the controller 150 acquires period information of a third sequence after the second sequence and updates the change information to determine whether the synchronization signal has been stabilized. In other words, the controller 150 determines the change information between the second and third sequences to determine whether a synchronization signal included in the third sequence has been stabilized.

The controller 150 determines time information of the stabilized synchronization signal and controls the communicator 180 to transmit shutter control data, which is generated based on the time information, to the 3D glasses 200.

In more detail, if the change information between the first and second sequences is less than the preset time information, the controller 150 determines a synchronization signal included in the second sequence as a stabilized synchronization signal and determines the period information of the second sequence as time information of the stabilized synchronization signal to generate the shutter control data based on the determined time information.

If a channel or an input source is changed, the controller 150 may perform operations as described above.

Because the first and second sequences of the synchronization signal refer to the preset number of frame sections into which the synchronization signal is divided, an operation of the controller 150 may be described in more detail below.

The controller 150 divides a plurality of synchronization pulses in preset numbers to group the plurality of synchronization pulses into a plurality of frame sections and determines whether the synchronization signal has been stabilized, according to a time difference between two of the plurality of frame sections to filter a synchronization signal which has non-uniform time intervals due to a 3D synchronization jitter.

In more detail, the controller 150 calculates an average of time intervals of synchronization pulses of two consecutive frame sections based on a predetermine frame section of the plurality of frame sections and calculates a time difference between the calculated averages.

Here, the controller 150 may calculate a time difference between averages calculated from a third frame section and a next frame section of the plurality of frame sections.

This operation may be performed if a channel change or an input source change occurs in the 3D display apparatus 100. This is because there is quite a possibility that time intervals of a synchronization signal will be non-uniform due to a 3D synchronization jitter in initial two frame sections from a time when the channel change or the input source change occurs in the 3D display apparatus 100.

Also, if the time difference between the two consecutive frame sections is greater than or equal to a preset threshold value, the controller 150 repeats the above calculation with respect to the second frame section of the two consecutive frame sections and a subsequent frame section. If the time difference between the two consecutive frame sections is smaller than the preset threshold value, the controller 150 may determine that synchronization signals included in the second frame section of the two consecutive frame sections and the subsequent frame section have been stabilized.

The controller 150 determines time information of the stabilized synchronization signals and controls the communicator 180 to transmit shutter control data, which is generated based on the time information, to the 3D glasses 200.

In other words, the controller 150 may generate shutter control data, which is to control opening and closing timings of the left and right eye shutter glasses of the 3D glasses 200, based on synchronization signals included in stabilized frame sections.

In particular, the shutter control data may be a signal which is to alternately open the left and right eye shutter glasses of the 3D glasses 200 (e.g., in the case of a shutter glasses method) at display times of left and right eye images and may include data related to turning on or off of the 3D glasses 200. In other words, the shutter control data may be generated in a packet form which includes 3D parameters for opening and closing the left and right eye shutter glasses of the 3D glasses 200. Also, the 3D parameters may include information regarding on-off times of the left and right eye shutter glasses.

The purpose of the shutter control is to display a left eye image on the display unit 140 at a left eye opening time of the 3D glasses 200 and a right eye image on the display unit 140 at a right eye opening time of the 3D glasses 200.

For example, a 3D parameter may include information that an open time of the left eye glass of the 3D glasses 200 is 0 ms, a close time of the left eye glass of the 3D glasses 200 is 16.682 ms, an open time of the right eye glass is 16.683 ms, and a close time of the right eye glass is 33.365 ms.

The 3D glasses 200 alternately open and close the left and right eye shutter glasses according to the shutter control data received from the 3D display apparatus 100 so that a user watches left and right eye images with left and right eyes, respectively.

A method by which the controller 150 determines whether a synchronization signal has been stabilized, in order to filter a synchronization signal having non-uniform time intervals, will now be described in more detail with reference to FIG. 3.

Figure 3:
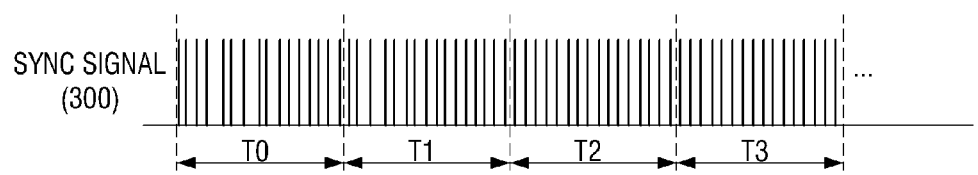
FIG. 3 is a view illustrating a method of filtering a synchronization signal according to an exemplary embodiment.

FIG. 3 is a view illustrating a method of filtering a 3D synchronization jitter according to an exemplary embodiment. Referring to FIG. 3, a synchronization signal 300 has a frame frequency of 60 Hz. Also, each of one or more preset events, i.e., an event of turning on a 3D mode in the 3D display apparatus 100, and a channel change event or an input source change event in the 3D mode, occurs at time "t".

The controller 150 sequentially divides a plurality of synchronization pulses into groups of 16 to group the plurality of synchronization pulses into a plurality of frame sections $T_0$, $T_1$, $T_2$, $T_3$ ... (i.e., a first sequence, a second sequence, a third sequence ...). The controller 150 first determines whether the synchronization signal 300 has been stabilized in the four frame sections.

However, as described above, since the initial two frame sections are first filtered, the controller 150 calculates a time difference between two consecutive frame sections $T_2$ and $T_3$ after the initial two frame sections $T_0$ and $T_1$.

In more detail, the controller 150 calculates an average of time intervals of synchronization pulses included in the two frame sections $T_2$ and $T_3$ (i.e., the controller 150 acquires period information between sequences). In other words, the controller 150 divides a time of the frame section $T_2$ by the same number as the number (16) of synchronization pulses included in the frame section $T_2$ to calculate an average of time intervals of the synchronization pulses included in the frame section $T_2$. The controller 150 calculates an average of time intervals of synchronization pulses included in the frame section $T_3$ by using the same method as that of calculating the average for the frame section $T_2$.

The controller 150 calculates a time difference between the calculated averages, i.e., determines change information between period information of sequences. In more detail, the controller 150 calculates a difference between an average of the synchronization pulses of the frame section $T_2$ and an average of the synchronization pulses of the frame section $T_3$.

The controller 150 compares the calculation result with a preset threshold value to determine whether a synchronization signal has been stabilized, i.e., determines whether the determined change information is preset time information to determine whether the synchronization signal has been stabilized. Here, the preset threshold value may be 4 μs.

If the calculation result is less than the preset threshold value, i.e., satisfies Equation 1 below, the controller 150 determines that the synchronization pulses of the frame section $T_3$, which is the second frame section of two frame sections, have been stabilized. In other words, the controller 150 determines that a synchronization signal included in a last one of received at least four or more synchronization pulse sequences has been stabilized.

The controller 150 may generate shutter control data, which is to control timings of openings and closings of the left and right eye shutter glasses of the 3D glasses 200, based on sync signals included in the frame section $T_3$ and subsequent frame sections $T_4, T_5, T_6 \ldots$.

$$|T_3-T_2|<0.4\mu(\sec) \quad (1)$$

However, if the calculation result is more than the preset threshold value, the controller 150 repeats the above calculation with respect to the frame section $T_3$ of two frame sections and the subsequent frame section $T_4$.

In other words, the controller 150 calculates averages of the intervals between successive synchronization pulses of the frame sections $T_3$ and $T_4$ and compares a difference between the calculated averages with a preset threshold value. For example, the preset threshold value may be 4 μs.

If the calculation result is less than the preset threshold value, i.e., satisfies Equation 2 below, the controller 150 determines that the synchronization pulses of the frame section $T_4$, which is the second frame section of two frame sections, have been stabilized. The controller 150 may generate shutter control data, which is to control opening and closing times of the left and right eye shutter glasses of the 3D glasses 200, based on the synchronization signals included in the frame section $T_4$ and subsequent frame sections $T_5, T_6 \ldots$.

$$|T_4-T_3|<0.4\mu(\sec) \quad (2)$$

However, if the calculation result is more than the preset threshold value, the controller 150 repeats the above calculation with respect to the frame section $T_4$ of two frame sections and the subsequent frame section $T_5$.

As described above, the controller 150 repeats the above-described operation until a time difference between two consecutive frame sections is smaller than a preset threshold value, to determine whether a synchronization signal has been stabilized.

As described with reference to FIG. 3, a plurality of synchronization pulses are sequentially divided into groups of 16, and an exemplary preset threshold value is 4 μs. However, this example is applicable when the frame frequency is 60 Hz, but may be differently set according to the frame frequency.

In the above described exemplary embodiment, an event of starting a 3D mode starts in the 3D display apparatus 100 and a channel change event or an input source change event in the 3D mode have been described as an example of twisting a timing of a synchronization signal. This is only an example, and the present inventive concept may be applied to a case where time intervals of successive pulses in a synchronization signal are non-uniform in the 3D display apparatus 100 due to other factors (e.g., interferences of external signals).

Referring to FIG. 2 again, the storage unit 160 is a storage medium which stores various types of programs necessary for operating the 3D display apparatus 100 and may be realized as a memory, a hard disk drive (HDD), or the like. For example, the storage unit 160 may include a read only memory (ROM) which is to store a program necessary for performing an operation of the controller 150, a random access memory (RAM) which is to temporarily store data generated by performing the operation of the controller 150, and so on. The storage unit 160 may further include an electronically erasable and programmable ROM (EEROM) which is to store various types of reference data, etc.

The user interface unit 170 transmits a user command, which is received from an input unit such as a remote controller, an input panel, or the like, to the controller 150. In particular, the user interface unit 170 may receive a user command to start the 3D mode and change a channel or an input source in the 3D mode.

The communicator 180 communicates with the 3D glasses 200. In more detail, the communicator 180 may include a radio frequency (RF) communication module to communicate with a communicator 210 of the 3D glasses 200 based on the RF communication protocol.

For example, the communicator 180 may include a Bluetooth communication module or a ZigBee communication module to communicate with the communicator 210 of the 3D glasses 200 according to a Bluetooth communication protocol or a ZigBee communication protocol.

The communicator 180 transmits the shutter control data, which is generated by the controller 150, to the 3D glasses 200. Therefore, the shutter control data may synchronize with output timings of left and right eye images in the 3D display apparatus 100 to turn on/off shutters of the 3D glasses 200.

The display unit 140 may include detailed structures such as a panel driver (not shown), a backlight driver (not shown), and a backlight emitter (not shown), and its detailed descriptions will be omitted.

The 3D display apparatus 100 according to the present exemplary embodiment may be realized to display a 3D image or both a 2D image and a 3D image. For example, the 3D display apparatus 100 may be realized as a 3D TV, but this is only an exemplary embodiment. Therefore, the 3D display apparatus 100 may be realized as any apparatus which can display a 3D image. For example, the 3D display apparatus 100 may be a 3D monitor, a 3D image projector, or the like.

If the 3D display apparatus 100 displays a 2D image, the 3D display apparatus 100 may use the same method as that used by an existing 2D display apparatus. If the 3D display apparatus 100 displays a 3D image, the 3D display apparatus 100 may receive a 3D image signal from a photographing apparatus, such as a camera or the like, or a 3D image signal which is captured by a camera and edited/processed and transmitted by a broadcasting station, process the received 3D image signal, and display the processed 3D image on a screen. In particular, the 3D display apparatus 100 may process left and right eye images, time-divide the processed left and right eye images, and alternately display the time-divided left and right eye images, with reference to a format of a 3D image.

Figure 4:
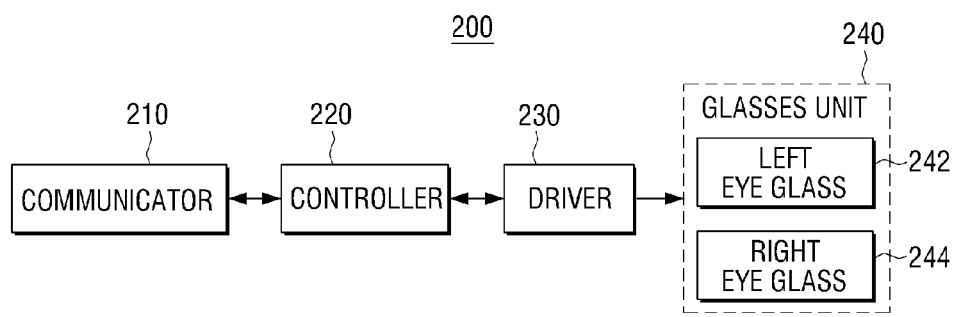
FIG. 4 is a block diagram illustrating a structure of 3D glasses according to an exemplary embodiment.

FIG. 4 is a block diagram illustrating a structure of the 3D glasses 200 according to an exemplary embodiment. Referring to FIG. 4, the 3D glasses 200 includes a communicator 210, a controller 220, a driver 230, and a glasses unit 240.

The 3D glasses 200 may be realized as active type shutter glasses. A shutter glasses type corresponds to a display method which uses a binocular disparity and which is to provide an image of a display apparatus and synchronize an on-off operation of left and right eye glasses of 3D glasses so that a user perceives an image observed at different angles as having a depth dimension due to brain activity.

The shutter glasses type has a principle of synchronizing left and right eye image frames played by the 3D display apparatus 100 with shutters of the 3D glasses 200. In other words, left and right eye glasses of the 3D glasses 200 may be selectively opened and closed according to left and right image signals of the 3D display apparatus 100 to generate a 3D image. A detailed structure of the 3D glasses 200 according to the present exemplary embodiment will now described.

The communicator 210 communicates with the 3D display apparatus 100. In more detail, the communicator 210 may include an RF communication module to perform RF communications with the communicator 180 of the 3D display apparatus 100 according to an RF communication protocol.

For example, the communicator 210 may include a Bluetooth communication module or a ZigBee communication module to communicate with the communicator 180 of the 3D display apparatus 100 according to a Bluetooth communication protocol or a ZigBee communication protocol.

The communicator 210 receives the shutter control data, which is generated for the 3D image by the controller 150 of the 3D display apparatus 100, and transmits the shutter control data to the controller 220.

The controller 220 controls an overall operation of the 3D glasses 200. In particular, the controller 220 generates a control signal based on the received shutter control data and transmits the control signal to the driver 230 to control the driver 230. In particular, the controller 220 controls the driver 230 to generate a driving signal, which is to drive the glasses unit 240, based on 3D parameters included in the shutter control data.

The driver 230 generates a shutter driving signal based on the control signal received from the controller 220. The driver 230 may be realized to pivot glasses of the glasses unit 240.

In particular, the glasses unit 240, which will be described later, includes a left eye shutter glass 242 and a right eye shutter glass 244. Therefore, the driver 230 generates a left eye shutter driving signal which is to drive a shutter of the left eye shutter glass 242 and a right eye shutter driving signal which is to drive a shutter of the right eye shutter glass 244 and respectively transmits the left and right eye shutter driving signals to the left eye shutter glass 242 and the right eye shutter glass 244.

The glasses unit 240 includes the left eye shutter glass 242 and the right eye shutter glass 244. The glasses unit 240 also opens and closes the left and right eye shutter glasses 242 and 244 according to the left and right eye shutter driving signals received from the driver 230.

Shutters of the left and right eye shutter glasses 242 and 244 may be realized by using liquid crystals. In other words, the glasses unit 240 may open and close the shutters by using liquid crystals of the left and right eye shutter glasses 242 and 244.

The 3D glasses 200 may include a power supply unit (not shown) which is to supply power to the 3D glasses 200. A power state of the power supply unit may be controlled by the controller 220.

Figure 5A:
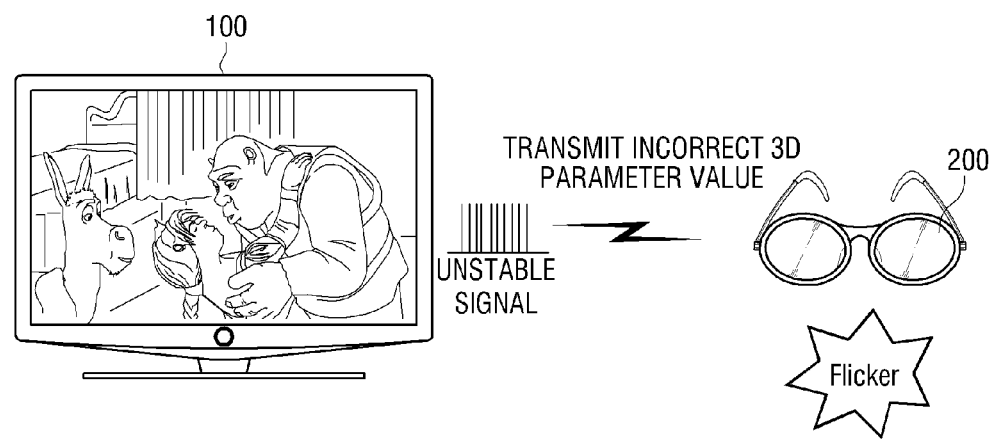
FIGS. 5A and 5B are views illustrating an operation of a 3D image providing system according to an exemplary embodiment.
Figure 5B:
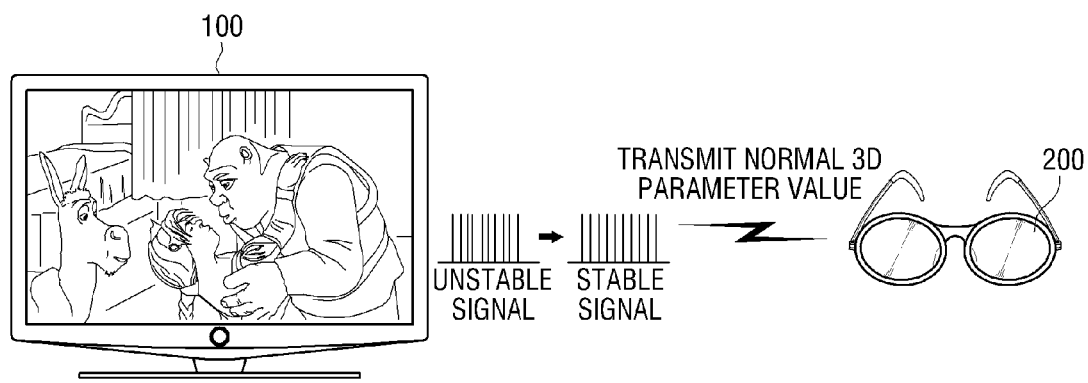

FIGS. 5A and 5B are views illustrating an operation of the 3D image providing system, according to an exemplary embodiment. In more detail, FIG. 5A illustrates an operation of the 3D image providing system which does not filter a synchronization signal, and FIG. 5B illustrates an operation of the 3D image providing system which filters a synchronization signal.

As shown in FIG. 5A, shutter control data is generated according to an unstable synchronization signal and transmitted to the 3D glasses 200. In other words, a 3D synchronization jitter occurs due to a start of a 3D mode in the 3D display apparatus 100 and a change of a channel or an input source in the 3D mode, and thus a timing of a synchronization signal is not uniform.

A shutter control signal, which is generated based on the unstable synchronization signal, includes an incorrect 3D parameter. In other words, on-off times of the left and right eye glasses of the 3D glasses 200 are not uniform. Therefore, since the left and right eye glasses of the 3D glasses 200 are not opened and closed at uniform time intervals, flickers may occur due to malfunctioning of the 3D glasses 200.

As shown in FIG. 5B, shutter control data is generated according to a stable synchronization signal and transmitted to the 3D glasses 200. In other words, this operation corresponds to a synchronization detection operation which is performed according to an exemplary embodiment.

Therefore, the shutter control data is generated according to the synchronization signal having pulses disposed at the uniform time intervals, transmitted to the 3D glasses 200, and includes a normal 3D parameter. Therefore, the left and right eye glasses of the 3D glasses 200 are opened and closed at uniform time intervals. Accordingly, malfunctioning of the 3D glasses 200 may be prevented.

FIG. 6 is a flowchart illustrating a 3D display method according to an exemplary embodiment.

In operation S610, a 3D image signal is displayed on a screen. In this case, a plurality of image frames, i.e., left and right eye image frames, may be alternately output.

In operation S620, a plurality of synchronization pulses are generated. In more detail, a plurality of synchronization pulses corresponding to output times of a plurality of image frames, i.e., display timings of left and right eye image frames, may be generated.

In operation S630, a determination is made as to whether the synchronization signals have been stabilized.

In detail, a plurality of synchronization pulses may be divided in preset numbers to group the plurality of synchronization pulses into a plurality of frame sections. Also, a determination may be made as to whether the synchronization signals have been stabilized, according to a time difference between two of the plurality of frame sections.

In more detail, based on a predetermined frame section of a plurality of frame sections, averages of time intervals of synchronization pulses included in two consecutive frame sections may be calculated, a time difference between the calculated averages may be calculated, and the time difference may be compared with a preset threshold value to determine whether the synchronization signals have been stabilized.

In other words, if the calculation result of the time difference between the two consecutive frame sections is more than the preset threshold value, the above-described calculation may be repeated with respect to the second frame section of the two consecutive frame sections and a subsequent frame section. If the calculation result is less than the preset threshold value, synchronization signals included in the second frame section of the two consecutive frame sections and the subsequent frame section may be determined to be stabilized.

In operation S640, shutter control data is generated and transmitted based on the stabilized synchronization signals.

In more detail, if the time difference between the two consecutive frame sections is less than the preset threshold value, shutter control data, which is to turn on or off shutters of 3D glasses, may be generated based on the synchronization signals of the second frame section of the two consecutive frame sections and the subsequent frame section, and transmitted to the 3D glasses. In other words, shutter control data is generated and transmitted based on synchronization pulses included in a frame section including stabilized synchronization signals and a subsequent frame section.

In operation S630, a determination may be made as to whether synchronization signals have been stabilized, according to a time difference between a third frame section of a plurality of frame sections and a subsequent frame section.

Also, in operation S630, if a channel change or an input source change of a 3D display apparatus occurs, the determination as to whether the synchronization signals have been stabilized may be performed.

In the present exemplary embodiment, the shutter control data may be transmitted to the 3D glasses by using an RF communication method. Also, the plurality of synchronization pulses may be sequentially divided into groups of 16 to be grouped into a plurality of frame sections, and the preset threshold value may be 4 μs.

The above-described methods may be realized by a 3D display apparatus according to an exemplary embodiment or another 3D display apparatus which does not include all of the same elements as those of the present 3D display apparatus.

Also, in the present inventive concept, the 3D display apparatus may include a recording medium which stores a program for executing a filtering method of filtering a 3D synchronization jitter.

In this case, the filtering method includes: sequentially dividing a plurality of synchronization pulses, which are generated at output times of first and second image frames of a 3D image signal, in preset numbers and grouping the plurality of synchronization pulses into a plurality of frame sections; and selecting a frame section for driving 3D glasses from the plurality of frame sections to filter the 3D synchronization jitter.

The filtering of the 3D synchronization jitter includes: sequentially dividing the plurality of synchronization pulses in the preset numbers to group the plurality of synchronization pulses into the plurality of frame sections; and determining whether the synchronization signals have been stabilized, according to a time difference between averages of intervals of successive synchronization pulses of two consecutive frame sections of the plurality of frame sections; and determining time information of the stabilized synchronization signals according to the determination result and transmitting shutter control data, which is generated based on the time information, to the 3D glasses. In order to determine whether the synchronization signals have been stabilized, averages of synchronization signals of two consecutive frame sections of the plurality of frame sections may be calculated based on a predetermined frame section of the plurality of frame sections, and a time difference between the calculated averages may be calculated. If the calculation result is more than a preset threshold value, the calculation may be repeated with respect to the second frame section of the two consecutive frame sections and a subsequent frame section. If the calculation result is less than the preset threshold value, a synchronization signal of the second frame section of the two consecutive frame sections may be determined to be stabilized.

A computer readable recording medium storing a program for executing such a filtering method includes all types of recording devices which store data which can be read by a computer system. Examples of the computer readable recording medium include a ROM, a RAM, a CD-ROM, a magnetic tape, a floppy disk, an optical data storage device, etc. The computer readable recording medium can also be distributed over network coupled computer systems so that a computer readable code is stored and executed in a distributed fashion. The filtering method may be realized by the above-described 3D display method.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A 3-dimensional (3D) display apparatus comprising:
a display unit which outputs a plurality of image frames;
a synchronization signal processor which generates a synchronization signal corresponding to the image frames;
a controller which acquires period information of first and second sequences of pulses of the synchronization signal and determines whether the synchronization signal has been stabilized, according to change information of the respective period information; and
a communicator which determines time information of the stabilized synchronization signal according to the determination result and transmits shutter control data, which is generated based on the time information, to 3D glasses.

2. The 3D display apparatus as claimed in claim 1, wherein the period information is determined by a preset number of pulses included in the synchronization signal.

3. The 3D display apparatus as claimed in claim 1, wherein the second sequence is a sequence of pulses of the synchronization signal immediately following the first sequence.

4. The 3D display apparatus as claimed in claim 1, wherein the change information is determined by a difference between the period information of the first sequence and the period information of the second sequence.

5. The 3D display apparatus as claimed in claim 1, wherein whether the synchronization signal has been stabilized is determined according to whether the change information is less than preset time information.

6. The 3D display apparatus as claimed in claim 1, wherein if a channel change or an input source change occurs, the controller determines whether the synchronization signal has been stabilized.

7. The 3D display apparatus as claimed in claim 1, wherein the communicator is a radio frequency (RF) communication module.

8. The 3D display apparatus as claimed in claim 1, wherein the time information is the period information of the second sequence.

9. The 3D display apparatus as claimed in claim 1, wherein the second sequence is a last one of at least four or more synchronization signal pulse sequences which are received by the controller.

10. The 3D display apparatus as claimed in claim 1, wherein if the change information is more than a preset time information, the controller acquires period information of a third sequence after the second sequence and updates the change information to determine whether the synchronization signal has been stabilized.

11. The 3D display apparatus as claimed in claim 1, wherein the shutter control data is data which is related to turning on or off of shutters of the 3D glasses.

12. A 3D display apparatus comprising:
a display unit which outputs a 3D image signal comprising a plurality of image frames;
a synchronization signal processor which generates a plurality of synchronization pulses at output times of the plurality of image frames;
a controller which divides the plurality of synchronization pulses in preset numbers to group the plurality of synchronization pulses into a plurality of frame sections and determines whether a synchronization signal has been stabilized, according to a time difference between two of the plurality of frame sections; and
a communicator which determines time information of the stabilized synchronization signal according to the determination result and transmits shutter control data, which is generated based on the time information, to 3D glasses.

13. The 3D display apparatus as claimed in claim 12, wherein the controller calculates averages of time intervals of synchronization pulses of two consecutive frame sections based on a predetermined one of the plurality of frame sections and calculates a time difference between the calculated averages.

14. The 3D display apparatus as claimed in claim 12, wherein the controller determines whether the synchronization signal has been stabilized according to a time difference between a third frame section and a subsequent frame section of the plurality of frame sections.

15. The 3D display apparatus as claimed in claim 12, wherein if the calculation result is more than a preset threshold value, the controller repeats the calculation with respect to the second frame section of the two consecutive frame sections and a subsequent frame section, and if the calculation result is less than the preset threshold value, the controller determines that synchronization signals of the second frame section of the two consecutive frame sections and the subsequent frame section have been stabilized.

16. The 3D display apparatus as claimed in claim 15, wherein the controller generates the shutter control data, which is related to turning on or off of shutters of the 3D glasses, based on the synchronization signals of the second frame section and the subsequent frame section and controls the communicator to transmit the shutter control data to the 3D glasses.

17. The 3D display apparatus as claimed in claim 12, wherein if a channel change or an input source change occurs, the controller determines whether the synchronization signal has been stabilized.

18. The 3D display apparatus as claimed in claim 12, wherein the communicator is an RF communication module.

19. The 3D display apparatus as claimed in claim 12, wherein the controller sequentially divides the plurality of synchronization pulses into groups of 16 to group the plurality of synchronization pulses into the plurality of frame sections and determines whether the synchronization signal has been stabilized, according to whether the time difference is smaller than or equal to 4 μs.

20. A 3D display method of a 3D display apparatus, the 3D display method comprising:
   outputting a 3D image signal comprising a plurality of image frames on a screen;
   generating a plurality of synchronization pulses at corresponding output times of the plurality of image frames;
   dividing the plurality of synchronization pulses in preset numbers to group the plurality of synchronization pulses into a plurality of frame sections and determining whether a synchronization signal has been stabilized, according to a time difference between two of the plurality of frame sections; and
   determining time information of the stabilized synchronization signal according to the determination result and transmitting shutter control data, which is generated based on the determined time information, to 3D glasses.

21. The 3D display method as claimed in claim 20, wherein the determination of whether the synchronization signal has been stabilized comprises:
   calculating averages of time intervals of synchronization pulses of two consecutive frame sections based on a predetermined frame section of the plurality of frame sections; and
   calculating a time difference between the calculated averages.

22. The 3D display method as claimed in claim 20, wherein whether the synchronization signal has been stabilized is determined according to a time difference between a third frame section and a subsequent frame section of the plurality of frame sections.

23. The 3D display method as claimed in claim 20, wherein if the calculation result is more than a preset threshold value, the calculation is repeated with respect to the second frame section of the two consecutive frame sections and a subsequent frame section, and if the calculation result is less than the preset threshold value, synchronization signals of the second frame section and the subsequent frame section are determined to be stabilized.

24. The 3D display method as claimed in claim 20, wherein the transmission of the shutter control data to the 3D glasses comprises:
   generating the shutter control data, which is related to turning on or off of shutters of the 3D glasses, based on synchronization signals of the second frame section and the subsequent frame section; and
   transmitting the generated shutter control data to the 3D glasses.

25. The 3D display method as claimed in claim 20, wherein if a channel change or an input source change occurs, a determination of whether the synchronization signal has been stabilized is made.

26. The 3D display method as claimed in claim 20, wherein the shutter control data is transmitted to the 3D glasses by using an RF communication method.

27. The 3D display method as claimed in claim 20, wherein the plurality of synchronization pulses are sequentially divided into groups of 16 to be grouped in to the plurality of frame sections, and whether the synchronization signal has been stabilized is determined according to whether the time difference is smaller than or equal to 4 μs.

28. A non-transitory recording medium which stores a computer-executable program for performing a filtering method of filtering a 3D synchronization jitter,
   wherein the filtering method comprises:
      sequentially dividing a plurality of synchronization pulses, which are generated at output times of corresponding first and second image frames of a 3D image signal, in preset numbers to group the plurality of synchronization pulses into a plurality of frame sections;
      selecting a frame section for driving 3D glasses from the plurality of frame sections to filter the 3D synchronization jitter;
      determining whether a synchronization signal has been stabilized, according to a time difference between averages of successive intervals of synchronization pulses of two consecutive frame sections of the plurality of frame sections;
      determining time information of the stabilized synchronization signal according to the determination result; and
      transmitting shutter control data, which is generated based on the time information, to the 3D glasses.

29. The recording medium as claimed in claim 28,
   wherein the averages of the successive intervals of the synchronization pulses of the two consecutive frame sections are calculated based on a predetermined frame section of the plurality of frame sections to calculate the time difference between the calculated averages, and
   wherein if the calculation result is more than a preset threshold value, the calculation is repeated with respect to the second frame section of the two consecutive frame sections and a subsequent frame section, and wherein if the calculation result is less than the preset threshold value, synchronization signals of the second frame section of the two consecutive frame sections are determined to be stabilized.

\* \* \* \* \*